(12) United States Patent
Huang et al.

(10) Patent No.: US 6,485,738 B1
(45) Date of Patent: Nov. 26, 2002

(54) DELIVERY SYSTEM FOR ENHANCED BIOAVAILABILITY OF NUTRIENTS AND SUPPLEMENTS

(76) Inventors: Sean Huang, 475 Las Pulgas Dr., Woodside, CA (US) 94062; Marcia Zimmerman, 700 Serrano Ct., Chico, CA (US) 95928; Dimitri Papadimitriou, 504 Sophia La., Shreveport, LA (US) 71115

( * ) Notice: Subject to any disclaimer, the term of this patent is extended or adjusted under 35 U.S.C. 154(b) by 0 days.

(21) Appl. No.: 09/915,864

(22) Filed: Jul. 26, 2001

(51) Int. Cl.⁷ .................... A61K 47/42; A61K 47/44; A61K 9/50
(52) U.S. Cl. .................... 424/439; 424/499; 424/500; 424/501; 424/502
(58) Field of Search .................. 424/439, 494, 424/496, 497, 498, 499, 500, 501, 502

(56) References Cited

U.S. PATENT DOCUMENTS 5,736,121 A * 4/1998 Unger .................. 424/9.4

* cited by examiner

Primary Examiner—Carlos Azpuru
(74) Attorney, Agent, or Firm—William J. Sapone; Coleman Sudol Sapone, P.C.

(57) ABSTRACT

A gel delivery system for promoting bioavailability and uptake of vitamins, minerals and other nutritional supplements comprises a gel base, preferably including agar, water and a bioavailablity enhancing composition that promotes absorption of the carried substance in the digestive tract.

13 Claims, No Drawings

DELIVERY SYSTEM FOR ENHANCED BIOAVAILABILITY OF NUTRIENTS AND SUPPLEMENTS

TECHNICAL FIELD

This invention relates to a gel composition for use as a delivery system for nutrients, medicaments, vitamins, minerals, herbal and nutritional supplements.

BACKGROUND

Various systems are known for use as carriers for delivering drugs, medicaments and nutritional supplements. For example, in U.S. Pat. No. 4,950,689 a pectin delivery system is described. This system seeks to deliver fiber with good taste by utilizing a pectin gel delivery system to form a confectionery unit combined with an edible insoluble solid to strengthen the chewable pectin gel network. The delivery system can be used to deliver a drug such as a laxative.

U.S. Pat. No. 4,857,331 describes a similar system, which is sugarless, including an algin gel component with a pectin component. U.S. Pat. No. 5,747,058 describes a high viscosity liquid composition for the delivery of substances, using a non-polymeric, non-water soluble high viscosity liquid carrier material that does not crystallize neat under ambient or physiological conditions. Sucrose acetate isobutyrate is described as such a substance.

In U.S. Pat. No. 4,576,645 a whipped gel composition is described that is useful to form a vehicle for delivering a spoonable soft gel composition to deliver substances to children.

While various substance delivery systems have been suggested, the search continues for delivery compositions that are low in cost, good tasting and render not only medicaments, but other nutritional substances palatable to children and easy to administer to adults. For example, various herbs and natural substances have gained popularity because they have beneficial properties, but these are dependant on bioavaliabilty to achieve the desired results. Many of these substances are unpalatable to children, who resist taking them. All too often, the benefits are not obtained because the normal digestive process degrades bioavailability and typical carriers, if any are used, do not promote bioavailability. In such a case, cost is an important factor. A sophisticated polymeric drug delivery system would likely not be practical for the delivery of, for example a vitamin C or E supplement to children. Consequently, a delivery system which increases bioavailability of the delivered substance, but at low cost, would be a particular benefit over the carriers used in the prior art.

SUMMARY OF THE INVENTION

It is an object of the present invention to provide a delivery composition that promotes bioavailability of the delivered component.

It is a further object to provide a delivery system that has a range of consistency to provide formulations from being spoonable to a rigid gel.

It is yet another object to provide a delivery system which is of low cost to allow use with various herbs, vitamin and nutritional supplements.

It is another object to provide a good tasting delivery system which masks the taste of the delivered substances.

These and other objects of the present invention are achieved by a delivery composition comprising a gel base, water and a bioavailability enhancing composition. Agar is a preferred gelling agent, most preferably used with gelatin to form a base. Agar is a phycocolloid derived from red algae, that is strongly hydrophilic. Agar is preferred to pectin because its smaller molecular structure helps in absorption of the delivered component. The gelatin/agar base provides a flexible base that can cover a full range of consistency, from spoonable suspension to a rigid gel. The base provides a stable environment for both water and lipid soluble substances. The bioavailability enhancing substance is preferably a surfactant such as a mixture of lecithin and Vitamin E which promotes absorption of the carried substance. Other ingredients, such as flavoring agents, coloring agents or thickeners, among others, can be incorporated in the present invention.

The present invention is a gel delivery system which uses a combination of mechanisms to enhance substance absorption. The mechanisms involve micellar solubilization, solid dispersion, and in situ emulsification. These improve the surfactant qualities of the gel preparation. Preferably, the inventive composition further comprises ingredients that support growth of selective gut micro flora that promote or maintain normal digestive function. The gel preferably has an all natural composition for delivering substances such as vitamins and minerals in a way that bypasses the poor disintegration or dissolution problems associated with solid dosage forms such as tablets or capsules. The gel system represents a convenient dosage form for delivering a wide variety of substances such as vitamins, minerals, herbs, food, supplements, medicaments, nutrients and further enhances their bioavailability. Use of the gel permits smaller dosages of vitamins and other nutrients to be used since greater uptake can be achieved. The gel, being an edible water-soluble and pliable matrix, reduces the difficulty in swallowing commonly encountered among children and the elderly population. Also, the gel is an effective taste-masking carrier for substances that have undesirable taste characteristics, due to its unusually high ratio of excipient to active components. For consumer convenience, the system can be packaged in a unit dose form. The gel may be formulated to include multiple vitamins and mineral preparations with their own enhanced bioavailability. The consistency of the gel can be changed to make it more fluid for beverage use or more solid for gummy type chewables.

DETAILED DESCRIPTION OF THE INVENTION

Importance of Surfactant Properties

The intestinal mucosa provides an enormous amount of surface area for the absorption of nutrients. While the actual length and circumference of the intestinal wall is about seven or eight feet, its inner surface is folded into many layers by millions of absorptive units called villi, increasing the total absorptive area of the small intestine to about 250 square meters. Each villus is covered with about 600 micro villi, each containing both a blood and a lymph vessel that will carry absorbed nutrients throughout the body. The vessels are separated from the nutrient slurry in the intestinal lumen by a membrane known as the mucosal barrier. The purpose of the barrier is to selectively admit specific micro molecules while inhibiting absorption of macromolecules. The mucosal barrier possesses a slight negative charge, a property that either attracts or repels molecules with polar properties. For example, ionic minerals with strong positive charges are attracted to the mucosal cells and may adhere to the surface, making them less bioavailable. The more active transition metals, iron and copper, can irritate the mucosa when they adhere to it.

Absorption occurs by one of three methods, either passive diffusion, active transport or facilitated active transport. Passive diffusion is simply the passage of molecules across the mucosal barrier until the concentrations of the molecules reach osmotic balance on both sides of the membrane. This is the primary method used by water, small ions and glucose. The other two transport mechanisms require energy to pump them against a concentration gradient or against an electrical potential. In active transport, the molecule is actively pumped across the mucosa. In facilitated transport, a carrier, generally a protein, is required to convey the nutrient across the membrane for absorption. Carrier systems are required by many nutrients including minerals, peptides and lipids. Absorbed water soluble nutrients are carried in the blood, some utilizing carrier systems, and fat soluble nutrients are attached to protein carriers and travel through the lymphatic system.

With such a vast absorptive area, a vehicle that increases the time of contact with the micro villi enhances absorption. In other words, an ideal absorption enhancer acts as a "spreading factor" allowing more of the micro villi access to nutrients before they are swished away by the peristaltic action of the intestines. Delivery systems that enhance surfactant qualities improve the bioavailability of fat soluble nutrients such as vitamin A and vitamin E. As a result, lower doses of these vitamins are required to reach optimum serum levels. The pharmacokinetic behavior of water soluble vitamins such as riboflavin, pyridoxine and vitamin C suggest these normally bombard the upper absorptive areas in the intestines which rapidly become saturated. As a result, mega doses of these vitamins normally by-pass the proximal segment of the jejunum and exit the body. In the case of vitamin C, gastrointestinal complaints such as bloating and flatulence are common, as unabsorbed vitamins can be irritating to the intestines. Nausea is a common side effect of B-vitamins taken on an empty stomach and unabsorbed riboflavin causes the bright yellow urine noted by those taking mega doses of the vitamin.

By altering the surfactant properties of the delivery vehicle, the invention allows vitamins to have greater intestinal contact over a longer period of time which increases their uptake and reduces side effects. The surfactant properties of this invention increase its spreading factor and promote increased uptake of the nutrients it carries.

Increased absorption with the gel depends on two functions;
  improving surfactant qualities utilizing micellar solubilization, solid dispersions, and in situ emulsification
  improving intestinal function by supporting growth of beneficial gut flora and use of ingredients with enhanced bioavailability The gel composition exhibits a two dimensional functionality for enhancing absorption of the nutrients in it. The first function facilitates the disposition of nutrients to the intestinal mucosa by means of self emulsification and colloidal dispersion associated with the use of the gel base. The second function supports the microflora that stabilize and normalize permeability of the intestinal mucosa and influence the gut barrier system.

The invention uses a gel composition for the efficient and rapid absorption of substances contained within it. The semi-solid consistency of the gel system maintains the constituents in a readily absorbable form. These may be in solution (dissolved), present in a colloidal micro particulate suspended state, or in an emulsified form. The constituents are exposed to a maximum amount of intestinal surface area for absorption. Furthermore, the gel imparts stability to twophase preparations, whether they are water/solid (colloidal) or water/oil (emulsified) suspensions.

How the gel is formulated contributes another unique characteristic. The use of gelatin and agar as gelling agents is preferred as it provides a smooth gel of desired consistency that can vary from being a viscous liquid suitable for drinking or pouring, to being a rigid non-flowing gel. The consistency of the example below is one that facilitates administration from a spoon or an appropriate container such as a small plastic cup. Of course, other hydro colloid gelling agents can be used other than or in addition to those used in the example. These include carrageenan, acacia, guar, arabic, ghatti, karaya, tragacanth, terra, pectin, tamarind seed, larch arabinogalactan, alginates, locust bean, xanthin, starch, veegum, and colloidal silica. Modified cellulose products such as sodium carboxymethylcellulose, hyroxypropylcellulose, methylcellulose, hydroxypropylmethylcellulose, methylethylcellulose, and hydroxyelthylcellulose can also be used. The following example embodies only those gelling agents that are of natural origin, although synthetic type gelling agents can also be used.

Another aspect of the gel delivery system is its all-water based composition free of vegetable oil which tends to reduce vitamin bioavailability as it has been reported in the scientific literature. The enhanced absorption of lipid soluble vitamins such as vitamin A, when given in an emulsion vehicle, has recently been substantiated.

Surfactant properties of the gel account for improvement in vitamin bioavailability and this has been documented for lipid soluble vitamins such as vitamin E or those with limited water solubility such as riboflavin. The preferred surfactant is a vitamin Ellecithin self emulsifiable system that does not require oil for functional stabilization of the emulsion. The micellar solubilization component of the gel is effective for emulsifying vitamins A and D as well as E. The constituents for the surfactant system facilitate the transport of nutrients across the intestinal wall by increasing the surface area of the lipophilic vitamins.

Ideally, the enhanced bioavailability is achieved with a surfactant system that a, consists of a 50:50 ratio of an emulsified form of vitamin E and self-emulsifiable lecithin. Furthermore, the surfactant system should be equal in concentration to that of the gelling agent used. Significant variations of this formula can result in prevention of gel formation and unacceptable taste palatability for the product.

Improved Bioavailability

The improved bioavailability characteristics of the gel depend on in situ liposome formation from lecithin and a unique form of vitamin E with surfactant properties. Liposome formation is one of the newer technologies used by the supplement, cosmetic and drug industries to improve uptake of ingredients with both water soluble and fat soluble characteristics. Liposomes change the surfactant properties of the ingredients and thus improve their absorbability in the intestines or on the skin surface. Lecithin, a common choice for liposome formation, is a phospholipid with polar heads and non-polar tails that forms conglomerates with herbs and other mixed soluble ingredients. Liposomes are described as a complex with the polar tails of the phospholipid pointing inward and the non-polar heads facing outward. Such formation effectively sequesters water soluble fractions and makes them more lipid friendly, hence attractive to mucosal villi. Liposome technology has been widely used in the drug and cosmetic industry, and to a lesser degree in the dietary supplement industry, to improve absorption of mixed fat and water soluble ingredients.

Solubilized vitamin E is used as an excipient in the gel to improve its overall surfactant qualities. This vitamin E forms liquid crystals in water at body temperature and functions to enhance drug, vitamin and mineral solubility in an aqueous environment by forming amphophilic micelles around hydrophobic nutrients in the gel. It has been described as forming a self-emulsifying system in the stomach. The vitamin E micelles facilitate transport across the intestinal wall by blocking the natural tendency to reject supplemented vitamins, minerals, herbs or drugs.

Other bioavailability or absorption enhancing substances may include, but are not limited to various surfactants such as various triglycerides, such as from butter oil, monoglycerides, such as of stearic acid and vegetable oils, esters thereof, esters of fatty acids, propylene glycol esters, the polysorbates, sodium lauryl sulfate, sorbitan esters, sodium sulfosuccinate, among other compounds.

Improving intestinal function is a widely accepted method for increasing absorption of nutrients and food utilization. Two ingredients with well-documented function on absorption enhancement can be used in the gel. These are two forms of soluble fiber with slightly different characteristics. A partially hydrolyzed guar gum may be included because of its ability to increase mineral absorption in human volunteers. It has also been shown to maintain healthy villi function and improve enzyme activity in animal models. In human volunteers, the fiber has improved bowel function, and fecal composition. All of these conditions can enhance gastrointestinal function and improve absorbability of carried substances. The second agent that can be used in the gel is arabinogalactans, a polysaccharide that functions primarily to increase the number and function of beneficial intestinal microflora, specifically Lactobacilli and Bifidobacteria. Intestinal microflora enhance uptake of several nutrients including water, vitamins and short chain fatty acids that are required for immune function. They also breakdown noxious chemicals that would otherwise reenter circulation and contaminate the entire body. Selective bacterial growth from the ingestion of soluble fiber have been recommended for bowel dysfunction and after antibiotic therapy.

In addition to the benefits mentioned above, the hemicellulose arabinogalactans helps stiffen the gel. It has also been used to granulate low-solubility vitamins such as riboflavin, improving their dispersability. The fiber acts as a processing aid to form microparticulate distribution of the vitamin in the gel, resulting in increased surface contact with the intestinal wall. Two other types of soluble fiber may be used in the gel for providing additional functions. The first of these serves primarily as a sweetener, masking the bitterness associated with certain vitamins. The second has a reinvigorating effect on intestinal villi that have been shrunk due to malnutrition.

There are a number of optional ingredients such as sweeteners and minerals that either can improved bioavailability or impart beneficial attributes to the gel. For example, calcium glycerophosphate was used in the example for its higher solubility over a broad range of pH values and its compatibility with other constituents of the formulation. Furthermore, it does not impart a chalky texture to the product, has a pleasant taste and is a more bio-available form of calcium, due to its better positioning with the cell membrane. An additional advantage of calcium glycerophosphate is its reduction of dental caries. To further the dental benefit of the gel, no sucrose should be used and the sweeteners selected should have low glycemic index with extended energy release. The concentration range for calcium glycerophosphate in the product may vary from about 2 to 18 percent, while sweetener concentration can vary from about 7 to 37 percent by weight.

The gel preferably consists of several groups of ingredients. These are the gel base, the surfactants, the absorption enhancers, sweeteners, stabilizers, flavorings and colors. The formula allows for delivery of various substances which in this example is a vitamin and mineral mix. Of course, numerous other substances can be delivered, such as nutrients, nutritional supplements, herbs, extracts, medicaments, etc, and the invention is not limited to the substances described in relation to the example.

The sweeteners chosen in this case do not stimulate a hypoglycemic response, making the gel suitable for diabetics and others with low glycemic tolerance. The gel is ideal for those with impaired intestinal absorption such as Crohn's disease, irritable bowel syndrome, ulcers, severe allergies or celiac disease. It is also an ideal delivery form for children's formulas and others who may have difficulty swallowing pills.

| Description | Ingredient | | % |
|---|---|---|---|
| Base | Gelatin | 0.20 | 1.412 |
| | Bacto Agar powder | 0.30 | 2.119 |
| | Water, | 0.24 | 1.667 |
| Surfactants | Vit E | 0.28 | 1.977 |
| | Lecithin | 0.30 | 2.119 |
| Absorption | Hydrolyzed Guar | 0.20 | 1.412 |
| Enhancers | Arabinogalactan | 0.50 | 3.531 |
| Sweeteners | Sweet Fiber | 0.40 | 2.825 |
| | Mannitol | 20.0 | 14.124 |
| | Dextrin | 8.00 | 56.497 |
| Stabilizers | Potassium Benzoate | 0.08 | 0.565 |
| | Citric Acid | 0.40 | 2.825 |
| Flavorings | Berry Flavor | 0.30 | 0.119 |
| | Concord Grape | 0.10 | 0.706 |
| | Grape Crystals | 1.00 | 7.062 |
| Coloring | Vegetable Juice, to | 0.10 | 0.706 |
| Nutrient | Vitamin Mix | 0.48 | 1.667 |
| | | 14.88 | 100.000 |

Ingredients

A wide variety of ingredients can be used with the gel delivery system. The example here includes vitamins and minerals. However the gel could deliver a different vitamin or mineral profile, herbs, amino acids, various phytochemicals or drugs. The form of calcium used in this formula is very soluble and highly bioavailable. In human volunteers, it was assimilated into bone better than other forms of calcium including carbonate, lactate, and phosphate. This form of calcium has been found to be effective against dental caries, an added benefit in use of the gel for children's products. The visual appeal of the gel in increased by using this calcium because it is more soluble and doesn't form cloudy suspension. The vitamin ingredients in the gel have been specially processed with soluble fiber to decrease their particle size and increase solubility in the gel and encourage liposome formation by the surfactants in the gel. This reduces vitamin smell, stomach discomfort, and increases taste acceptance. The following formula was designed as exemplary for a full batch run. It should be noted that the amount of the mix included in the gel formula listed above is for a small sample batch, and the amount can vary and be from about 0.1 to 12% or more of the combined composi tion. Again, as stated previously, because of increased bioavailability, lesser amounts of the active component can be used with greater effectiveness, reducing the cost of the composition without sacrificing effectiveness.

| VITAMIN MIX | | |
|---|---|---|
| Ingredient | Grams | % Total |
| Calcium | 2.50 | 76.923 |
| Vitamin A | 0.06 | 1.846 |
| Vitamin D (100,000 | 0.01 | 0.308 |
| Thiamine | 0.01 | 0.308 |
| Niacinamide | 0.01 | 0.308 |
| Riboflavin | 0.01 | 0.308 |
| Vitamin C | 0.41 | 12.615 |
| L-Selenomethionine | 0.24 | 7.385 |
| | 3.25 | 100 |

Consistency of the gel can be modified. For this example, the gel consistency of the example was designed to deliver vitamins and minerals. However by adding more water to the gel, and reducing the agar, it can be made into a suitable beverage without altering its absorption qualities. Conversely, it can be made more solid by increasing the agar content. This would be desirable if the gel were to be made into a chewable gummy type consistency.

Storage and Transportation

The product once prepared can be poured into a suitable container and preferably refrigerated to allow for gel formation. Maintaining the gel under refrigeration while in storage will reduce any vitamin odors. Refrigeration during transport is not necessary since the gel viscosity is sufficient to withstand transportation shocks and is properly preserved.

When an agar/gelatin base is used, the agar to gelatin ratio can vary from 0.5 to 1 to 2.5 to 1, agar to gelatin. The amount of substance carried can also vary from 10 to 75% of the formulated composition. For example, a basic composition which relies on agar and surface area retention for absorption could consist of about 8% gelatin, about 12% agar, about 10% water and about 70% vitamin mix. Up to about 20% of a bioavailability enhancing composition that may be a mixture (50/50) of vitamin E and lecithin are used to enhance surfactance and thus promote absorption. Other compounds such as hydrolized guar and/or arabinogalactan as absorption enhancers, sweeteners, sytabilizers, flavorings, and colorants can also be added as desired, those these are optional ingredients and not necessary for achieving the results of the present invention.

While preferred embodiments of the invention have been shown and described, it will be understood by those skilled in the arts that various changes or modifications can be made without varying from the scope of the present invention.

We claim:

1. A delivery composition comprising a gel base, soluble fiber, water and a bioavailability enhancing composition.

2. The composition of claim 1 wherein the gel base contains agar.

3. The composition of claim 1, wherein the bioavailability enhancing composition is a surfactant.

4. The composition of claim 1 wherein the bioavailability enhancing composition is a mixture of lecithin and vitamin E.

5. The composition of claim 1 wherein the bioavailability enhancing substance is a 50:50 mixture of lecithin and vitamin E.

6. The delivery composition of claim 1 further comprising a carried substance.

7. The delivery composition of claim 1 wherein the gel base is about 1–30% wt. of the composition, the bioavailability enhancing composition comprises about 1–20% of the composition; water comprises about 1–20% of the composition, the composition capable of delivering from 1–75% of a carried substance.

8. A gel composition comprising a gel base containing 0.5 to 1, to 2.5 to 1, agar to gelatin; water; soluble fiber; a bioavailibility enhancing substance; and, a carried substance.

9. The gel composition of claim 8 where the bioavailability enhancing substance is selected from the group consisting of triglycerides, monoglycerides, esters thereof, esters of fatty acids, propylene glycol esters, polysorbate, sodium lauryl sulfate, sorbitan esters, sodium sulfosuccinate, Vitamin E and lecithin.

10. The composition of claim 8 wherein the bioavailability enhancing composition is a mixture of lecithin and vitamin E.

11. The composition of claim 8 wherein the bioavailability enhancing substance is a 50:50 mixture of lecithin and vitamin E.

12. The composition of claim 8 further comprising soluble fiber.

13. A method for delivering a carried substance for absorption in a digestive tract of a mammal comprising:

providing a delivery composition containing a gel base, soluble fiber, water and a bioavailability enhancing substance;

combining the delivery composition with the carried substance; and orally administering the combination to the mammal.

* * * * *